US012288020B2

(12) United States Patent
Cheng et al.

(10) Patent No.: US 12,288,020 B2
(45) Date of Patent: Apr. 29, 2025

(54) INTEGRATED CIRCUIT DESIGN AND LAYOUT WITH MULTIPLE INTERPRETERS

(71) Applicant: Synopsys, Inc., Mountain View, CA (US)

(72) Inventors: Chia-Hsuan Cheng, Hsinchu (TW); Yao-Jih Hung, Hsinchu (TW); Chi-Liang Yang, Taichung (TW)

(73) Assignee: Synopsys, Inc., Sunnyvale, CA (US)

( * ) Notice: Subject to any disclaimer, the term of this patent is extended or adjusted under 35 U.S.C. 154(b) by 440 days.

(21) Appl. No.: 17/835,822

(22) Filed: Jun. 8, 2022

(65) Prior Publication Data

US 2022/0398370 A1 Dec. 15, 2022

Related U.S. Application Data

(60) Provisional application No. 63/208,940, filed on Jun. 9, 2021.

(51) Int. Cl.
*G06F 30/392* (2020.01)
*G06F 30/31* (2020.01)

(52) U.S. Cl.
CPC ............ *G06F 30/392* (2020.01); *G06F 30/31* (2020.01)

(58) Field of Classification Search
CPC ...................................................... G06F 30/392
USPC .......................................................... 716/119
See application file for complete search history.

(56) References Cited

U.S. PATENT DOCUMENTS 9,298,871 B1 * 3/2016 Fallon ................... G06F 30/323

* cited by examiner

*Primary Examiner* — Eric D Lee
(74) *Attorney, Agent, or Firm* — Patterson + Sheridan, LLP

(57) ABSTRACT

A method for generating a circuit layout includes generating a plurality of symbols. Each of the plurality of symbols identifies one of multiple versions of code describing a circuit layout. The method also includes loading the plurality of symbols into a design platform used to compile the code describing the circuit layout. The design platform has evaluators for the multiple versions of the code. The method further includes generating the circuit layout described by the code using the design platform.

20 Claims, 8 Drawing Sheets

INTEGRATED CIRCUIT DESIGN AND LAYOUT WITH MULTIPLE INTERPRETERS

RELATED APPLICATION

This application claims priority to and the benefit of U.S. Provisional Patent Application Ser. No. 63/208,940, entitled "MULTIPLE PYTHON INTERPRETERS IN CUSTOM COMPILER," filed Jun. 9, 2021, which is incorporated herein by reference in its entirety.

TECHNICAL FIELD

The present disclosure generally relates to integrated circuit (IC) design and layout. In particular, the present disclosure relates to a custom compiler having multiple interpreters.

BACKGROUND

The PYTHON application programming interface (API) may be used to create layouts for circuit designs. Specifically, the PYTHON API may be used to create PYTHON parameterized cells (PyCells) at any level of complexity that operate in the Open Access environment. A circuit layout described by the PYTHON code (e.g., .py or .pyc) may be generated using a design platform (e.g., a software tool such as Custom Compiler) having a PyCell evaluator. The design platform (e.g., Custom Compiler) may provide analog, digital, and mixed-signal IC design, including design entry, simulation management and access, and layout editing. A PyCell evaluator includes a PYTHON interpreter that reads and executes the PYTHON code and then generates the layout in Open Access database. The design platform can read the layout from Open Access database.

SUMMARY

The present disclosure describes systems and methods for creating layouts for circuit designs. According to an embodiment, a method for generating a circuit layout includes generating a plurality of symbols. Each of the plurality of symbols identifies one of multiple versions of code describing a circuit layout. The method also includes loading the plurality of symbols into a design platform used to compile the code describing the circuit layout. The design platform has evaluators for the multiple versions of the code. The method further includes generating the circuit layout described by the code using the design platform.

The code may be associated with at least one of the plurality of symbols corresponding to one of the multiple versions.

The method may include appending, to each of the plurality of symbols, a suffix identifying the one of the multiple versions for that symbol. The method may also include identifying a symbol of the plurality of symbols with an appended suffix that corresponds with a version of the code and using the identified symbol to generate the circuit layout.

The method may include generating, via an evaluator of the design platform, a symbol table including the symbols for each of the multiple versions.

The method may include generating the symbols in a shared library of each of the evaluators such that the symbols in the shared library identify one of the multiple versions associated with the evaluators.

The design platform may include a PYTHON design platform.

The code may include PYTHON code.

According to another embodiment, a system includes a memory and a processor communicatively coupled to the memory. The processor generates a plurality of symbols. Each of the plurality of symbols identifies one of multiple versions of code describing a circuit layout. The processor also loads the plurality of symbols into a design platform used to compile the code describing the circuit layout. The design platform has evaluators for the multiple versions of the code. The processor further generates the circuit layout described by the code using the design platform.

The code may be associated with at least one of the plurality of symbols corresponding to one of the multiple versions.

The processor may append, to each of the plurality of symbols, a suffix identifying the one of the multiple versions for that symbol. The processor may also identify a symbol of the plurality of symbols with an appended suffix that corresponds with a version of the code and use the identified symbol to generate the circuit layout.

The processor may generate, via an evaluator of the design platform, a symbol table including the symbols for each of the multiple versions.

The processor may generate the symbols in a shared library of each of the evaluators such that the symbols in the shared library identify one of the multiple versions associated with the evaluators.

The design platform may include a PYTHON design platform.

The code may include PYTHON code.

According to another embodiment, a non-transitory computer readable medium stores instructions for generating a circuit layout that, when executed by a processor, cause the processor to load a first symbol into a customer compiler used to compile code describing a circuit layout. The design platform has evaluators for multiple versions of the code. The first symbol includes a first suffix identifying a first version of the multiple versions. The instructions also cause the processor to load a second symbol into the design platform. The second symbol includes a second suffix identifying a second version of the multiple versions different from the first version. The instructions further cause the processor to identify one of the first symbol or the second symbol based on a version of the code corresponding to the first version or the second version and generate the circuit layout described by the code using the design platform and the identified one of the first symbol or the second symbol.

The first symbol and the second symbol may be loaded into a symbol table of the design platform.

The design platform may include a PYTHON design platform.

The code may include PYTHON code.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
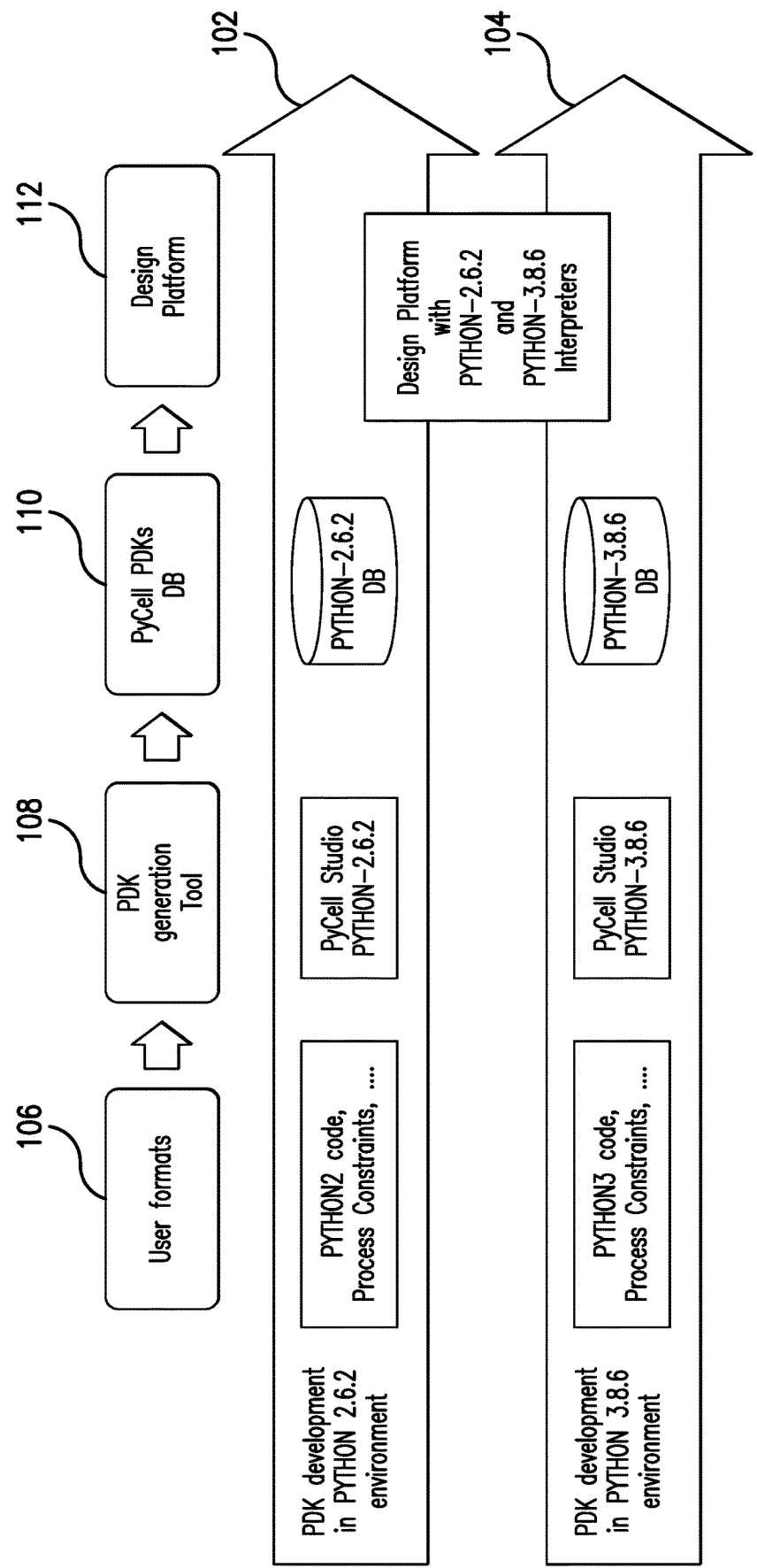
FIG. 1 is a block diagram showing a design platform with multiple interpreter versions.

Aspects of the present disclosure relate to a design platform (e.g., Custom Compiler) with multiple interpreters. A circuit layout may be described using PYTHON code. A design platform having a PYTHON parameterized cell (PyCell) evaluator and a PYTHON interpreter may read and execute the PYTHON code to generate the circuit layout.

PYTHON bytecode or syntax may not be compatible across different PYTHON versions. When the design platform is tasked with evaluating multiple versions of PYTHON code, the design platform may use multiple PyCell evaluators and PYTHON interpreters to read and execute the PYTHON code. Each PyCell evaluator and PYTHON interpreter may evaluate a different version of the PYTHON code to generate PyCells with different versions. When each version of the code is evaluated, the shared libraries of the PyCell evaluator and PYTHON interpreter evaluating that version of the code are loaded in the design platform. For example, symbols for the PyCell evaluator and PYTHON interpreter may be loaded into a symbol table, which is a data structure used by a language translator (e.g., as a compiler or interpreter), where each identifier (or symbol) in a program's source code is associated with information relating to its declaration or appearance in the source. Each symbol represents one or more functions or variables in shared libraries. The design platform may call and access these functions and variables using the symbols. The same symbols, however, may be used across different PYTHON versions, which may cause conflicts to occur in the design platform. Specifically, symbols for a first PyCell evaluator or PYTHON interpreter may be loaded into the symbol table so that the first PyCell evaluator or PYTHON interpreter may evaluate a first version of PYTHON code. Because some of these symbols are shared across different versions, a second PyCell evaluator or PYTHON interpreter may subsequently use these symbols when evaluating a second version of PYTHON code, which results in errors.

The present disclosure describes a design platform that implements symbol versioning to assist PyCell evaluators and PYTHON interpreters find the correct symbols in the symbol table. Specifically, the symbols for a PyCell evaluator or PYTHON interpreter may identify a version of the code being evaluated by the PyCell evaluator or PYTHON interpreter. For example, the symbols may include a suffix that identifies the version. When the PyCell evaluator or PYTHON interpreter identifies or looks up a symbol from the symbol table, the PyCell evaluator or PYTHON interpreter may first determine whether the version identified by the symbol matches the version of the code being evaluated by the PyCell evaluator or PYTHON interpreter before using that symbol. In this manner, the PyCell evaluator or PYTHON interpreter may not mistakenly use symbols that are meant for another PyCell evaluator or PYTHON interpreter evaluating another version of code.

This design platform may present several technical advantages. For example, by implementing symbol versioning, this design platform may use different PyCell evaluators and PYTHON interpreters to evaluate different versions of code without encountering conflicts in the symbol table. Specifically, because the symbols in the symbol table identify a version, the different PyCell evaluators and PYTHON interpreters may use these versions identified by the symbols to retrieve the correct symbols from the symbol table. As a result, the PyCell evaluators or PYTHON interpreters may avoid retrieving and using symbols with the incorrect versions.

A design platform may be implemented with multiple PYTHON interpreters. For example, as shown in FIG. 1, different PYTHON process design kits (PDKs) with different versions may be opened at the same session. The different versions may include a PDK for PYTHON version 2.6 (also referred to as version 2.6.2 and shown with the arrow 102) and a PDK for PYTHON version 3.8 (e.g., also referred to as version 3.8.6 and shown with the arrow 104). It is appreciated that different versions of PYTHON may be used without deviating from the present disclosure.

As seen in FIG. 1, PDK development in PYTHON 2.6 (shown with arrow 102) and PDK development in PYTHON 3.8 (shown with arrow 104) use particular user formats 106, PDK generation tools 108, and PyCell PDK databases (DBs) 110. PDK development in PYTHON 2.6 uses PYTHON2 code and process constraints, PyCell Studio for Python 2.6.2, and a PYTHON 2.6.2 DB. PDK development in PYTHON 3.8 uses PYTHON3 code and process constraints, PyCell Studio for PYTHON 3.8.6, and a PYTHON 3.8.6 DB.

A design platform 112 may include interpreters for both PYTHON versions. In the example of FIG. 1, the design platform 112 includes an interpreter for PYTHON 2.6.2 and an interpreter for PYTHON 3.8.6. There are various challenges when opening different version PDKs using the same session, including a PYTHON limitation when the PYTHON bytecode or syntax are not compatible in different PYTHON versions, and a symbol conflict where two PYTHON interpreters cannot be used in a process. While certain examples provided herein are described with respect to specific versions, the aspects of the present disclosure may be applied for implementing a custom compiler for any version of source code to be interpreted.

Figure 2:
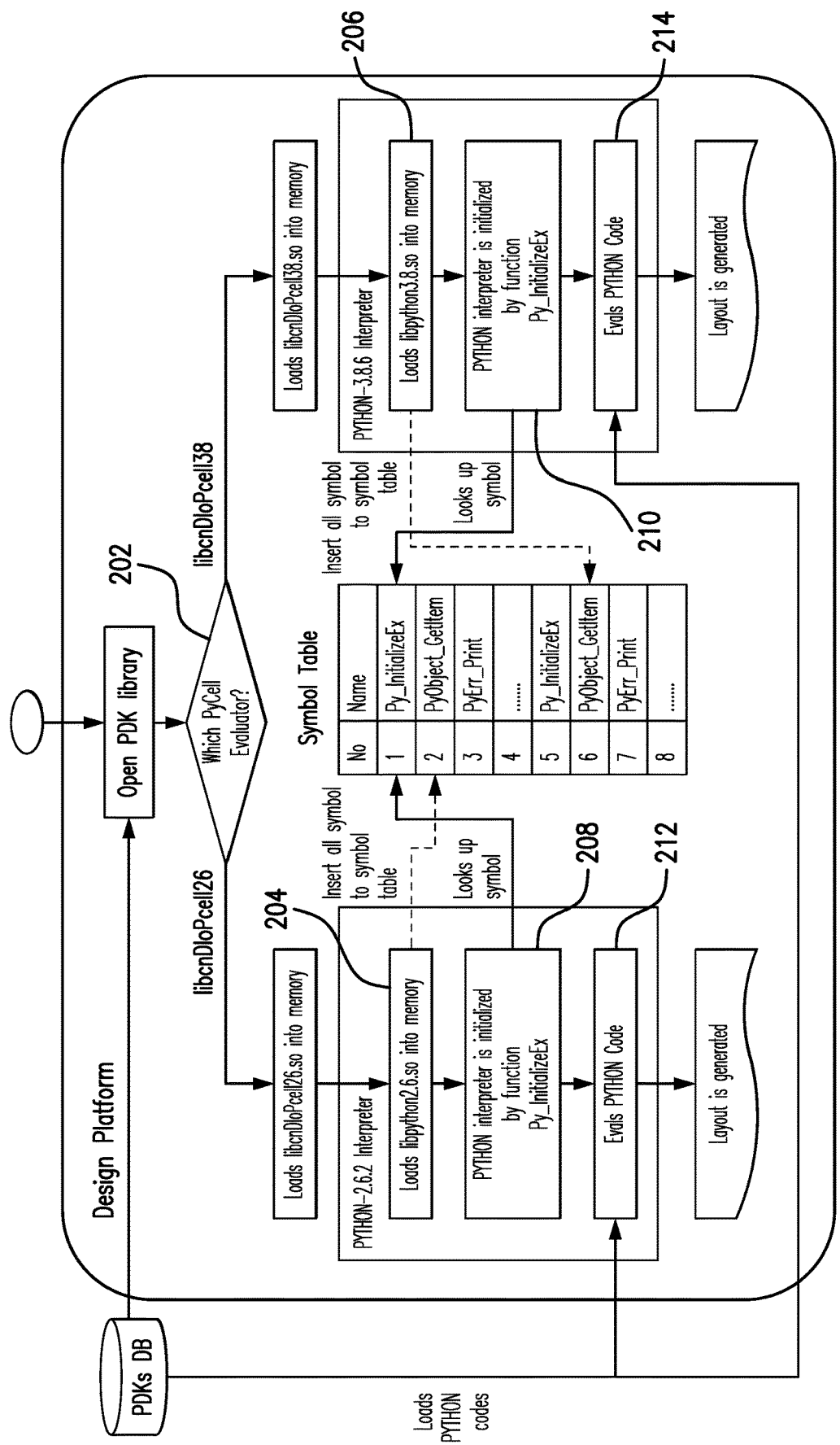
FIG. 2 illustrates a design platform process with multiple PYTHON parameterized cell (PyCell) evaluators and PYTHON interpreters using symbols with no version identifiers.

FIG. 2 illustrates a design platform process. The PyCell evaluator name and PYTHON code may be stored in a PDK database (DB). The PDK database may store PyCell evaluators and PYTHON code with different versions. For example, the evaluator may be a shared library for version 2.6.2 (libcnDloPcell26.so) or a shared library for version 3.8.6 (libcnDloPcell38.so). After opening the PDK library, the design platform determines, at 202, which PyCell evaluator to use. The PyCell evaluator is then loaded into memory for the design platform. For example, if the design platform determines that version 2.6.2 should be used, then the design platform loads libcnDloPcell26.so into memory. If the design platform determines that version 3.8.6 should be used, then the design platform loads libcnDloPcell38.so into memory. In some embodiments, the design platform determines which PyCell evaluator to use by examining the version of the PDK library or PYTHON code retrieved from the PDK database. The design platform may select the PyCell evaluator for the version of the PDK library or PYTHON code. The design platform may load and use multiple PyCell evaluators. In the example of FIG. 2, the design platform has loaded the PyCell evaluator for version 2.6.2 and the PyCell evaluator for version 3.8.6.

Each PyCell evaluator then loads a PYTHON shared library for the PYTHON interpreter into memory. Using the previous example, if the PyCell evaluator is for version 2.6.2, then the PyCell evaluator loads the PYTHON shared library for the version 2.6.2 interpreter (libpython2.6.so) into memory in 204. If the PyCell evaluator is for version 3.8.6, then the PyCell evaluator loads the PYTHON shared library for the version 3.8.6 interpreter (libpython3.8.so) into memory in 206.

Each PyCell evaluator loads the symbols in its respective library to a symbol table (e.g., in a Linux executable). The symbol table is a data structure that is shared by the different PyCell evaluators. As a result, the symbols for version 2.6.2 and the symbols for version 3.8.6 are all loaded into the symbol table. The symbols will appear in the symbol table in the order in which they were loaded. In the example of FIG. 2, the symbols for version 2.6.2 are loaded first into the symbol table in a first set of rows and then the symbols for version 3.8.6 are loaded into the symbol table in a subsequent set of rows. As a result, the symbols for version 2.6.2 appear first in the symbol table. Additionally, as seen in FIG. 2, some of the symbols for version 2.6.2 and some of the symbols for version 3.8.6 have the same names (e.g., Py_InitializeEx, PyObject_GetItem, and PyErr_Print). As discussed previously, these shared names may result in conflicts.

The PyCell evaluator then initializes a PYTHON interpreter. As seen in FIG. 2, the PyCell evaluator may initialize a PYTHON 2.6.2 interpreter in 208 or a PYTHON 3.8.6 interpreter in 210. During initialization, the PyCell evaluator looks up and uses the Py_InitializeEx symbol in the symbol table. In the example of FIG. 2, because the two different versions both include a symbol named Py_InitializeEx, the PyCell evaluator for version 2.6.2 and the PyCell evaluator for version 3.8.6 may look up the same symbol from the symbol table. Notably, because the symbol table is traversed in order (e.g., top-down), both the PyCell evaluator for version 2.6.2 and the PyCell evaluator for version 3.8.6 will encounter the symbol Py_InitializeEx for version 2.6.2 first (e.g., in row 1) and assume that they have located the appropriate symbol. The PyCell evaluator for version 3.8.6 should have used the symbol Py_InitializeEx for version 3.8.6 (e.g., in row 5) instead. As a result, the PyCell evaluator for version 3.8.6 will not initialize its PYTHON interpreter properly in 210.

The PYTHON interpreters evaluate PYTHON code in 212 and 214. Because the PYTHON interpreter for version 2.6.2 was initialized using the correct symbol, the PYTHON code with version 2.6.2 is evaluated properly. On the other hand, because the PYTHON interpreter for version 3.8.6 was initialized using the incorrect symbol, the PYTHON code with version 3.8.6 is evaluated improperly.

In other words, when two PYTHON interpreters are loaded into the design platform, there are many symbols (e.g. Py_InitializeEx) that are the same and which are loaded in the symbol table. Thus, it cannot be guaranteed that the symbol is used correctly for the interpreters of different versions.

Figure 3:
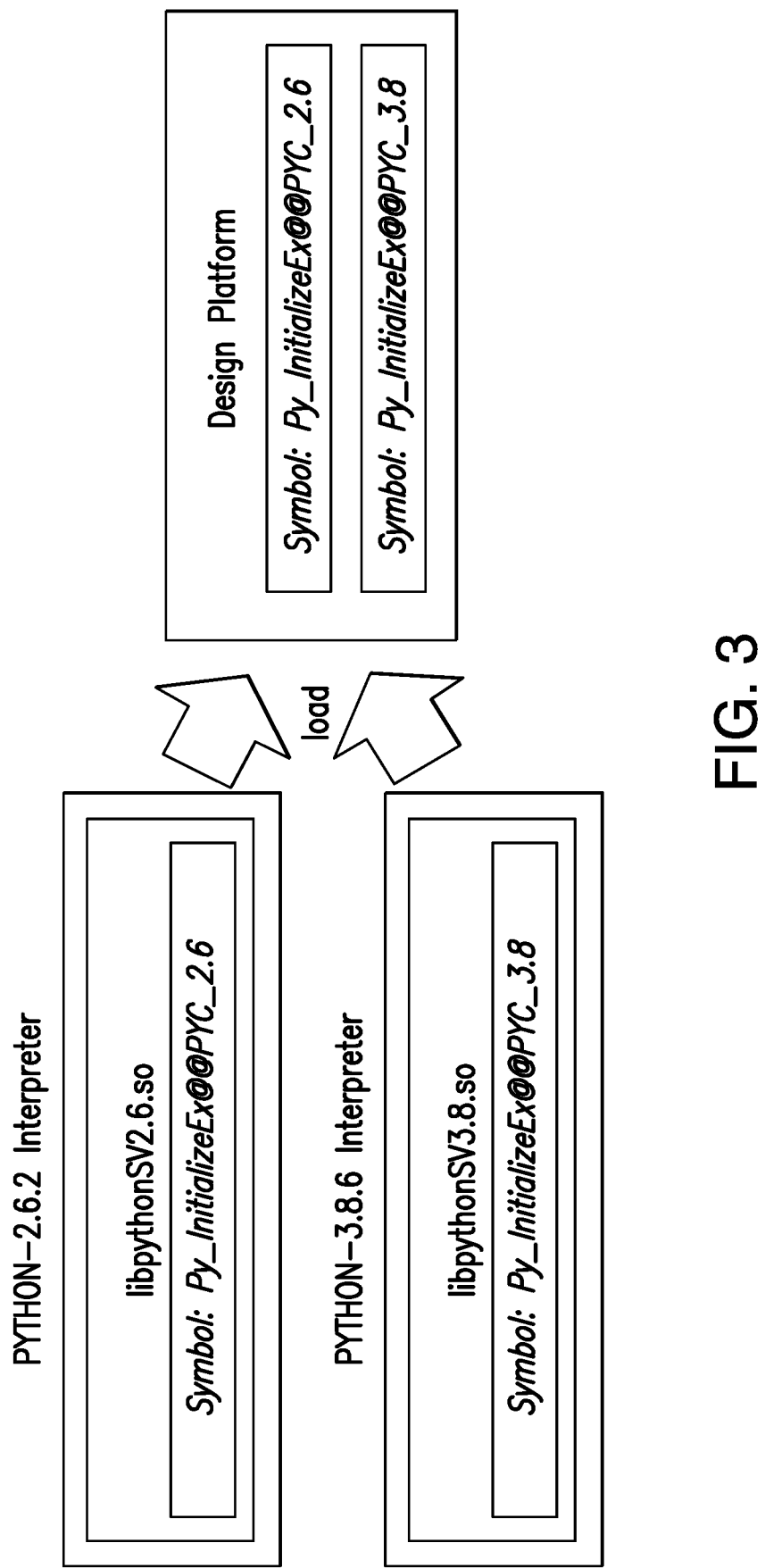
FIG. 3 illustrates symbols implemented with version identifiers, in accordance with certain aspects of the present disclosure.

To avoid symbols with the same name but associated with different PYTHON versions from being loaded into the symbol table, the present disclosure describes a design platform that uses a version suffix in shared libraries to allow the design platform to load multiple PYTHON interpreters. For example, as shown in FIG. 3, the symbol Py_InitializeEx for version 2.6.2 may have a suffix @@PYC_2.6, and the symbol Py_InitializeEx for version 3.8.6 may have a suffix @@PYC_3.8. In this manner, the name of the symbol is appended with a suffix that identifies the version for that symbol. The symbol names are differentiated from each other based on the versioning. When a PyCell evaluator looks up the symbol from the symbol table, the PyCell evaluator may determine whether the correct symbol has been retrieved using the versioning in the symbol name.

The symbol version (e.g. the version suffix) may be generated by a linker command script that includes a command specifically for specifying a version script. The version script may be specified to the linker by means of a '--version-script' linker command line option. Version scripts may be meaningful when creating shared libraries. The command script syntax may be VERSION {version script contents}. As will be discussed later with respect to FIG. 5, the symbols are loaded into a symbol table in the memory when the PYTHON shared library for the PYTHON interpreter is loaded.

Figure 4:
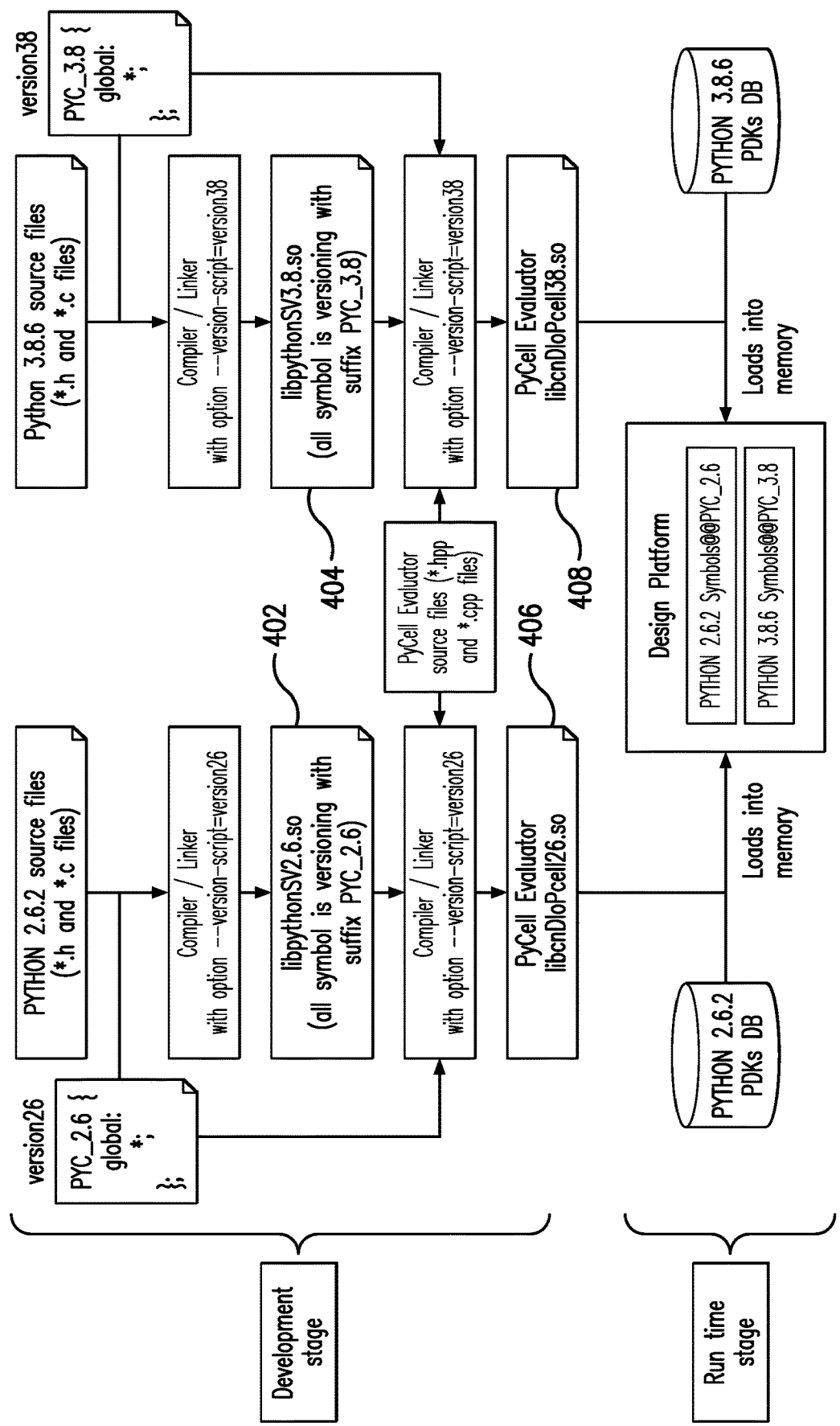
FIG. 4 illustrates techniques for implementing symbol versioning, in accordance with certain aspects of the present disclosure.

FIG. 4 illustrates techniques for implementing symbol versioning, in accordance with certain aspects of the present disclosure. As shown, PYTHON source code may be downloaded and compiled with symbol version identification as described. To compile the PYTHON source code, a version-script and a version file may be specified to generate a symbol version in the PYTHON shared library.

As shown in the example of FIG. 4, at 402 and 404, the symbols in the shared libraries may be appended with the suffix PYC_2.6 or PYC_3.8. Specifically, the version-script "version26" may be used for the PYTHON 2.6.2 code to append the suffix PYC_2.6 to the symbols used for the PYTHON 2.6.2 code. In the example of FIG. 4, the script is:

```
PYC_2.6 {
    global:
        *;
};
```

The version-script "version38" may be used for the PYTHON 3.8.6 code to append the suffix PYC_3.8 to the symbols used for the PYTHON 3.8.6 code. In the example of FIG. 4, the script is:

```
PYC_3.8 {
    global:
        *;
};
```

Notably, the symbols for the different versions of PYTHON code are appended with different suffixes. In the example of FIG. 4, the suffixes identify the version of the PYTHON code. However, it is understood that any suitable suffix may be appended to the symbols to distinguish or differentiate and identify symbols for one version of code from symbols for another version of code. Although the described examples use a suffix to distinguish symbols of different versions, it is also understood that any suitable identifier may be used to distinguish symbols for different versions. For example, a prefix may be added to the beginning of each symbol name to distinguish the symbols for different versions. As another example, a version identifier may be embedded in the middle of the symbol names to distinguish the symbols for different versions.

In the example of FIG. 4, there are two PyCell evaluators (e.g., one for each of versions 2.6.2 and 3.8.6). The evaluators may be loaded into the custom compiler. In some aspects, at 406 and 408, the PyCell evaluators (e.g., PyCell evaluator source files, as shown) may be compiled to specify the version-script and a version file and to generate symbol version in the PyCell evaluator shared library (e.g., to generate PyCell evaluator libcnDloPcell26.so and libcnDloPcell38.so). Using this process, the design platform can load multiple PYTHON interpreters because the symbols identify their respective versions. The PYTHON PDK DBs for the different versions PYTHON code (.py or .pyc) can be evaluated to generate layout by the specific PyCell evaluator loaded in the custom compiler.

Specifically, because the symbols for the different versions of PYTHON code are appended with a suffix that distinguishes the symbols for the different versions of code, the interpreters for the different versions can identify and locate the appropriate symbols for their corresponding versions in the shared symbol table. The interpreters may use the correct symbols from the symbol table and avoid using symbols that are designated for other versions. As a result, the design platform may load multiple evaluators and multiple interpreters to compile and evaluate different versions of code.

In some embodiments, the source code of the PYTHON interpreter is not modified to accommodate the versioned symbols. Rather, the version is provided when building the shared library of the PYTHON interpreter. When the design platform is linked against a shared library that has versioned symbols, the design platform understands which version of each symbol it should use, and the design platform understands which version is appropriate from each shared library it is linked against.

Figure 5:
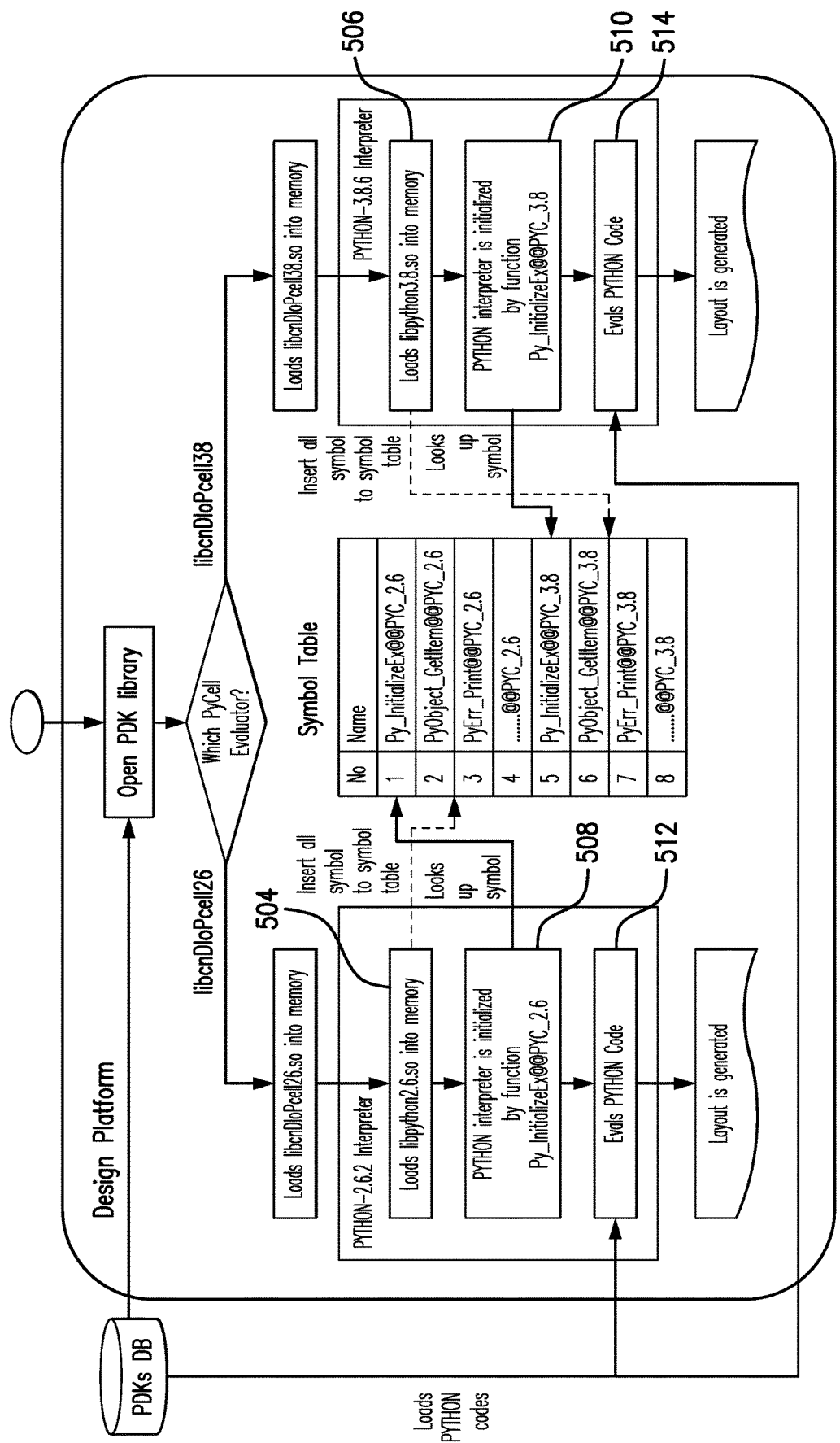
FIG. 5 illustrates a design platform process implemented using symbols with version identifiers, in accordance with certain aspects of the present disclosure.

FIG. 5 illustrates a design platform process implemented using symbols with version identifiers. As shown in FIG. 5, the PYTHON-2.6.2 and PYTHON-3.8.6 interpreters may insert symbols in the symbol table. Specifically, in 504, the PYTHON-2.6.2 interpreter loads into the symbol table symbols for version 2.6.2 when the shared library for the PYTHON interpreter (libpython2.6.so) is loaded into memory. For example, the PYTHON-2.6.2 interpreter may load the symbols Py_InitializeEx@@PYC_2.6, PyObject_GetItem@@PYC_2.6, and PYErr_Print@@PYC_2.6 into the symbol table. Because these symbols are loaded first, they are positioned first in the symbol table (e.g., Py_InitializeEx@@PYC_2.6 is positioned in row 1, PyObject_GetItem@@PYC_2.6 is positioned in row 2, and PYErr_Print@@PYC_2.6 is positioned in row 3).

In 506, the PYTHON-3.8.6 interpreter loads into the symbol table symbols for version 3.8.6 when the shared library for the PYTHON interpreter (libpython3.8.so) is loaded into memory. For example, the PYTHON-3.8.6 interpreter may load the symbols Py_InitializeEx@@PYC_3.8, PyObject_GetItem@@PYC_3.8, and PYErr_Print@@PYC_3.8 into the symbol table. Because these symbols are loaded second, they are positioned later in the symbol table (e.g., Py_InitializeEx@@PYC_3.8 is positioned in row 5, PyObject_GetItem@@PYC_3.8 is positioned in row 6, and PYErr_Print@@PYC_3.8 is positioned in row 7). Notably, the symbols for version 2.6.2 and for version 3.8.6 share the same base names. The symbols for the different versions are distinguished from each other by the different suffixes (e.g., @@PYC_2.6 and @@PYC_3.8) appended to the base names.

The PYTHON interpreters are then initialized by function, which involves looking up the corresponding symbols in the symbol table. In 508, the PYTHON-2.6.2 interpreter looks up the Py_Initialize symbol for version 2.6.2 in the symbol table. The interpreter locates the symbol Py_Initialize@@PYC_2.6 in row 1 of the symbol table. The interpreter may determine that this symbol is the correct symbol for version 2.6.2 based on the suffix @@PYC_2.6 indicating that the symbol is for the version for the code (e.g., by the matching version numbers). The interpreter then initializes using the function for this symbol. In 510, the PYTHON-3.8.6 interpreter looks up the Py_Initialize symbol for version 3.8.6 in the symbol table. The interpreter locates the symbol Py_Initialize@@PYC_2.6 in row 1 of the symbol table. Even though the base name is correct, the interpreter understands that this symbol is not applicable to version 3.8.6 because the suffix identifies the wrong version. The interpreter then continues down the symbol table and locates the symbol Py_Initialize@@PYC_3.8 in row 5. The interpreter may determine that this symbol is the correct symbol for version 3.8.6 based on the suffix @@PYC_3.8 indicating that the symbol is for the version for the code (e.g., by the matching version numbers). The interpreter then initializes using the function for this symbol. Notably, each interpreter uses the correct symbol because the symbols include a suffix that distinguishes the symbols from each other so that duplicate symbols in the symbol table are avoided. After each interpreter is initialized, the interpreters may be used to evaluate their respective PYTHON code in 512 and 514 to generate circuit layouts described by the PYTHON code.

Figure 6:
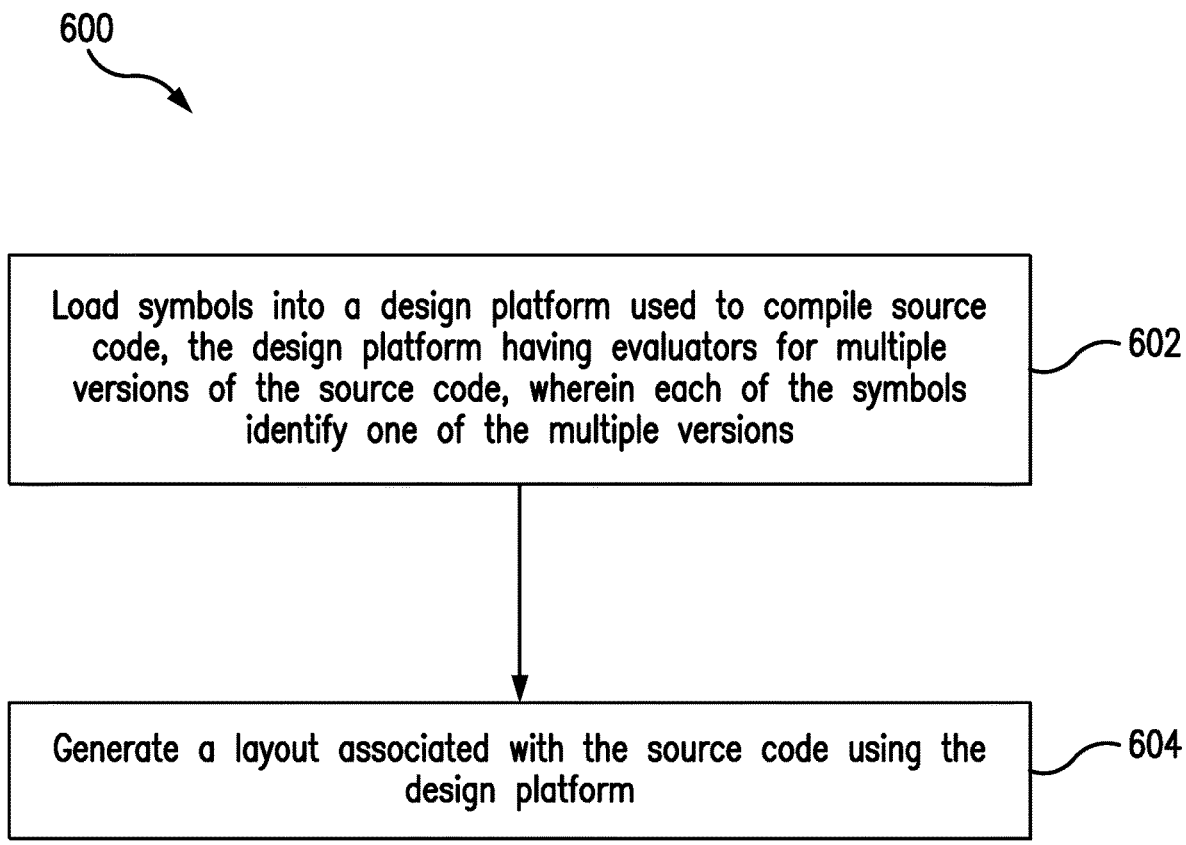
FIG. 6 is a flow diagram illustrating an example operation for compiling, in accordance with certain aspects of the present disclosure.

FIG. 6 illustrates an example operation 600 for compiling using multiple PyCell evaluators, in accordance with certain aspects of the present disclosure. The operation 600 may be performed by one or more processors (e.g., in the example computer system 800 of FIG. 8) implementing PyCell evaluators for different PYTHON versions.

The operation 600 begins, at 602, with one or more of the PyCell evaluators loading symbols into a custom compiler used to compile PYTHON code (e.g., .py or .pyc). The design platform has PYTHON evaluators (include PYTHON interpreters) for different versions of the PYTHON code (e.g., versions 2.6.2 and 3.8.6). In some aspects, each of the symbols may identify one of the multiple versions. For example, the symbols may be generated by appending a suffix identifying one of the multiple versions. These suffixes distinguish the symbols for one version from the symbols for another version. The symbols are then loaded into a symbol table that is shared between the PYTHON evaluators.

The PyCell evaluators load the appropriate symbols from the symbol table to evaluate the PYTHON code. Each evaluator may identify, from the symbol table, the appropriate symbols for their respective versions using the suffixes appended to the symbols. For example, each evaluator may determine that a symbol is correct by matching the version in the suffix appended to the symbol with the code version for that evaluator. In some aspects, a compiler (e.g., linker) will generate the symbols in a shared library of each of the evaluators such that the symbols in the shared library identify the version associated with the evaluator. The PyCell evaluators then evaluate the PYTHON code using the symbols to generate the circuit layouts. At 604, the PyCell evaluators generate a circuit layout described by the PYTHON code using the design platform.

Figure 7:
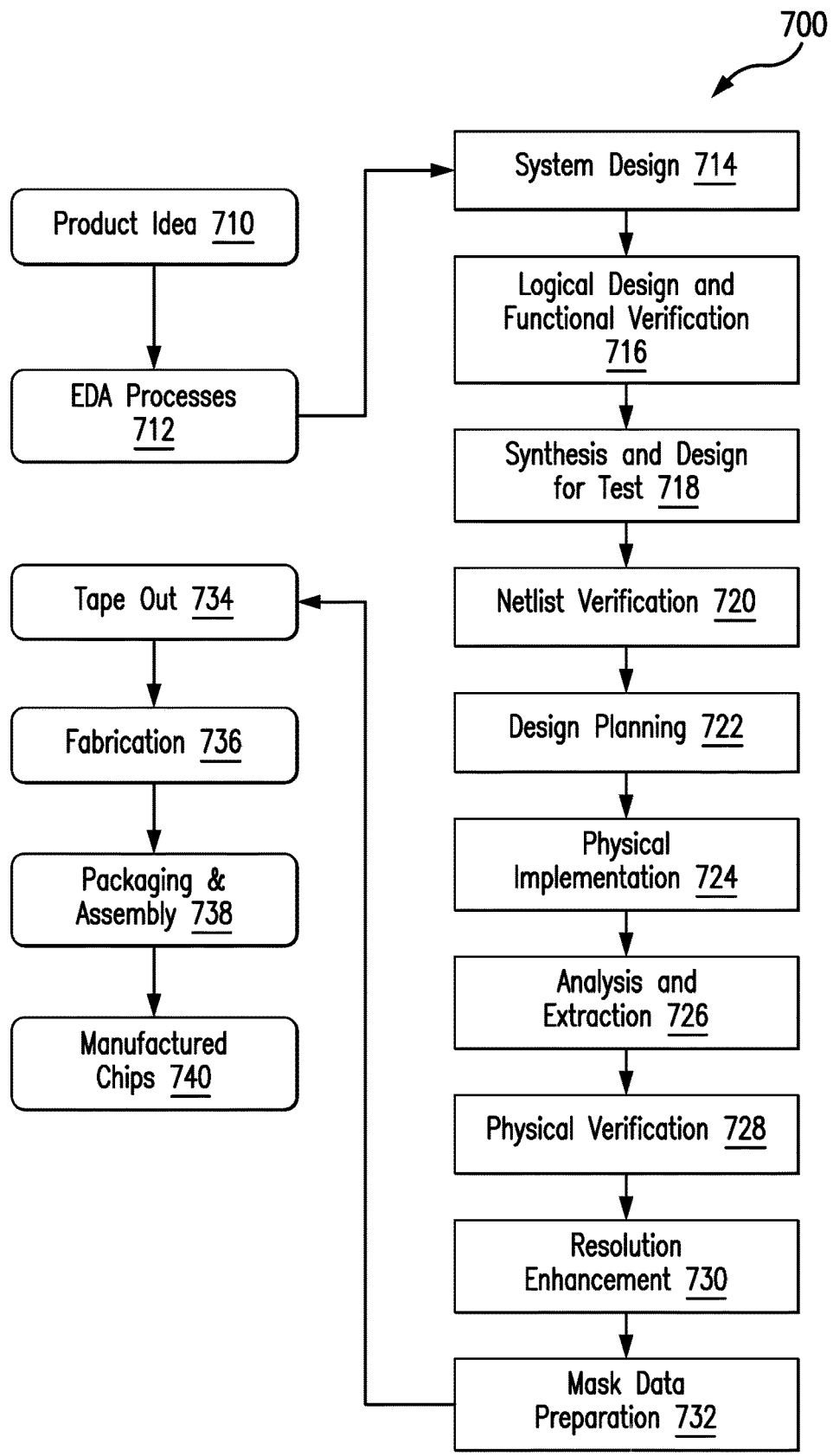
FIG. 7 depicts a flowchart of various processes used during the design and manufacture of an integrated circuit in accordance with some examples of the present disclosure.

FIG. 7 illustrates an example set of processes 700 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 710 with information supplied by a designer, information which is transformed to create an article of manufacture that uses a set of EDA processes 712. When the design is finalized, the design is taped-out 734, which is when artwork (e.g., geometric patterns) for the integrated circuit is sent to a fabrication facility to manufacture the mask set, which is then used to manufacture the integrated circuit. After tape-out, a semiconductor die is fabricated 736 and packaging and assembly processes 738 are performed to produce the finished integrated circuit 740.

Specifications for a circuit or electronic structure may range from low-level transistor material layouts to high-level description languages. A high-level of representation may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower representation level that is a more detailed description adds more useful detail into the design description, for example, more details for the modules that include the description. The lower levels of representation that are more detailed descriptions can be generated by a computer, derived from a design library, or created by another design automation process. An example of a specification language at a lower level of representation language for specifying more detailed descriptions is SPICE, which is used for detailed descriptions of circuits with many analog components. Descriptions at each level of representation are enabled for use by the corresponding systems of that layer (e.g., a formal verification system). A design process may use a sequence depicted in FIG. 7. The processes described by be enabled by EDA products (or EDA systems).

During system design 714, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 716, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 718, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 720, the netlist is checked for compliance with timing constraints and for correspondence with the HDL code. During design planning 722, an overall floor plan for the integrated circuit is constructed and analyzed for timing and top-level routing.

During layout or physical implementation 724, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 726, the circuit function is verified at the layout level, which permits refinement of the layout design. During physical verification 728, the layout design is checked to ensure that manufacturing constraints are correct, such as DRC constraints, electrical constraints, lithographic constraints, and that circuitry function matches the HDL design specification. During resolution enhancement 730, the geometry of the layout is transformed to improve how the circuit design is manufactured.

During tape-out, data is created to be used (after lithographic enhancements are applied if appropriate) for production of lithography masks. During mask data preparation 732, the 'tape-out' data is used to produce lithography masks that are used to produce finished integrated circuits.

A storage subsystem of a computer system (such as computer system 800 of FIG. 8) may be used to store the programs and data structures that are used by some or all of the EDA products described herein, and products used for development of cells for the library and for physical and logical design that use the library.

Figure 8:
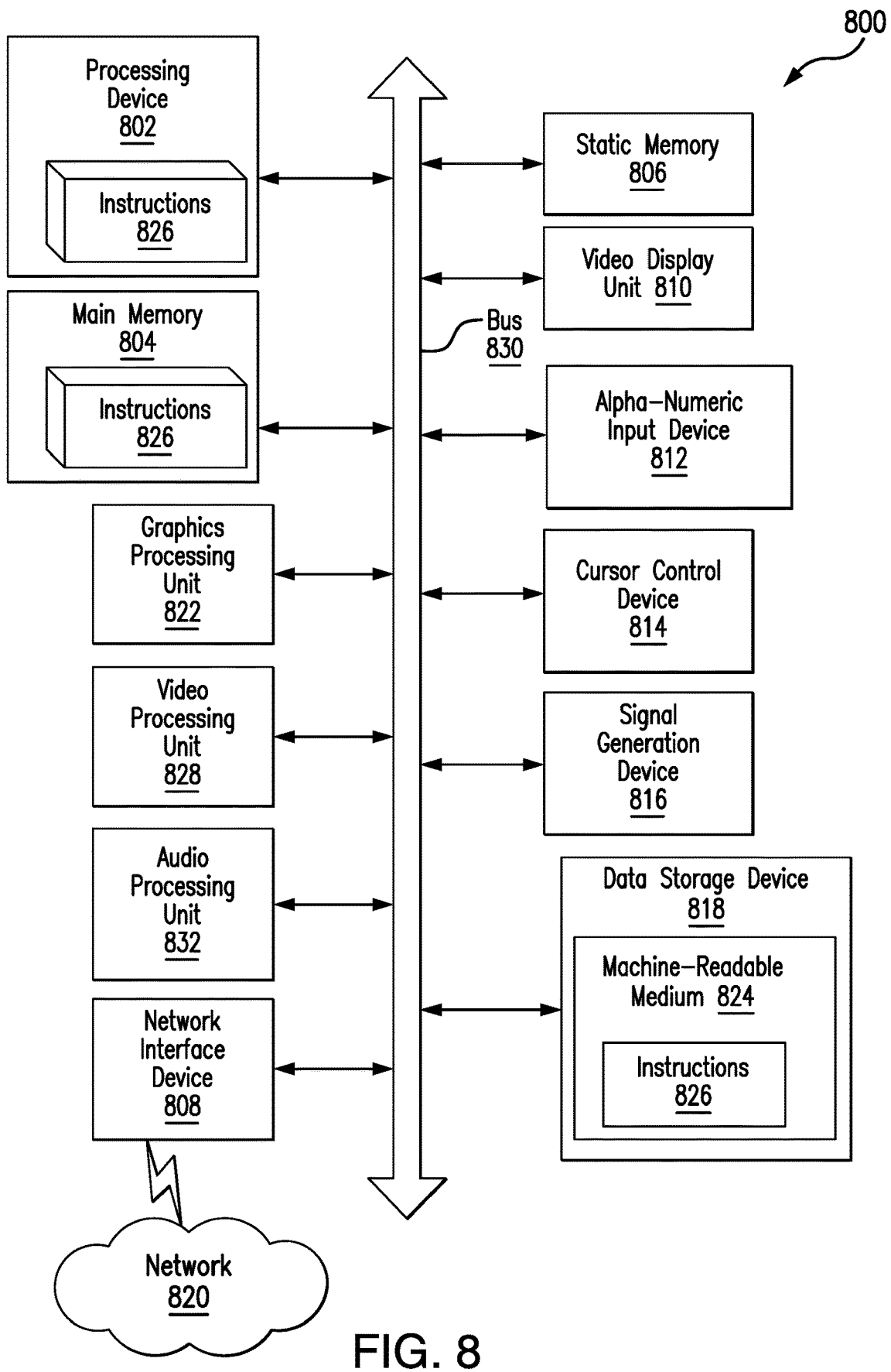
FIG. 8 depicts a diagram of an example computer system in which examples of the present disclosure may operate.

FIG. 8 illustrates an example machine of a computer system 800 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 800 includes a processing device 802, a main memory 804 (e.g., read-only memory (ROM), flash memory, dynamic random access memory (DRAM) such as synchronous DRAM (SDRAM), a static memory 806 (e.g., flash memory, static random access memory (SRAM), etc.), and a data storage device 818, which communicate with each other via a bus 830.

Processing device 802 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 802 may be configured to execute instructions 826 for performing the operations and steps described herein.

The computer system 800 may further include a network interface device 808 to communicate over the network 820. The computer system 800 also may include a video display unit 810 (e.g., a liquid crystal display (LCD) or a cathode ray tube (CRT)), an alphanumeric input device 812 (e.g., a keyboard), a cursor control device 814 (e.g., a mouse), a graphics processing unit 822, a signal generation device 816 (e.g., a speaker), graphics processing unit 822, video processing unit 828, and audio processing unit 832.

The data storage device 818 may include a machine-readable storage medium 824 (also known as a non-transitory computer-readable medium) on which is stored one or more sets of instructions 826 or software embodying any one or more of the methodologies or functions described herein. The instructions 826 may also reside, completely or at least partially, within the main memory 804 and/or within the processing device 802 during execution thereof by the computer system 800, the main memory 804 and the processing device 802 also constituting machine-readable storage media.

In some implementations, the instructions 826 include instructions to implement functionality corresponding to the present disclosure. While the machine-readable storage medium 824 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 802 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

The invention claimed is:

1. A method for generating a circuit layout, the method comprising:
generating (i) a first symbol that indicates a first version and (ii) a second symbol that indicates a second version;
loading the first symbol and the second symbol into a design platform having a first evaluator for the first version and a second evaluator for the second version;
initializing a first interpreter of the first evaluator using the first symbol based on the first symbol indicating the first version and the second symbol indicating the second version; and
generating the circuit layout using the first interpreter.

2. The method of claim 1, wherein the circuit layout is described using code associated with the first version.

3. The method of claim 1, wherein loading the first symbol and the second symbol comprises appending a suffix identifying the first version to the first symbol and appending a suffix identifying the second version to the second symbol.

4. The method of claim 3, further comprising:
identifying the first symbol with the appended suffix identifying the first version; and
using the identified first symbol to generate the circuit layout.

5. The method of claim 1, wherein loading the first symbol and the second symbol comprises loading the first symbol and the second symbol into a symbol table.

6. The method of claim 1, further comprising generating the first symbol and the second symbol in a shared library of the first evaluator and the second evaluator such that the first symbol and the second symbol in the shared library identify the first version and the second version.

7. The method of claim 1, wherein the design platform comprises a PYTHON design platform.

8. The method of claim 1, wherein the circuit layout is described using code comprising PYTHON code.

9. A system for generating a circuit layout, the system comprising:
a memory; and
a processor communicatively coupled to the memory, the processor configured to:
generate (i) a first symbol that indicates a first version and (ii) a second symbol that indicates a second version;
load the first symbol and the second symbol into a design platform having a first evaluator for the first version and a second evaluator for the second version;
initialize a first interpreter of the first evaluator using the first symbol based on the first symbol indicating the first version and the second symbol indicating the second version; and
generate the circuit layout using the first interpreter.

10. The system of claim 9, wherein the circuit layout is described using code associated with the first version.

11. The system of claim 9, wherein loading the first symbol and the second symbol comprises appending a suffix identifying the first version to the first symbol and appending a suffix identifying the second version to the second symbol.

12. The system of claim 11, wherein the processor is further configured to:
identify the first symbol with the appended suffix identifying the first version; and
use the identified first symbol to generate the circuit layout.

13. The system of claim 9, wherein loading the first symbol and the second symbol comprises loading the first symbol and the second symbol into a symbol table.

14. The system of claim 9, wherein the processor is further configured to generate the first symbol and the second symbol in a shared library of the first evaluator and the second evaluator such that the first symbol and the second symbol in the shared library identify the first version and the second version.

15. The system of claim 9, wherein the design platform comprises a PYTHON design platform.

16. The system of claim 9, wherein the circuit layout is described using code comprising PYTHON code.

17. A non-transitory computer readable medium storing instructions for generating a circuit layout that, when executed by a processor, cause the processor to:
load a first symbol into a design platform used to compile code describing a circuit layout, wherein the first symbol comprises a first suffix identifying a first version;
load a second symbol into the design platform, wherein the second symbol comprises a second suffix identifying a second version different from the first version, wherein the design platform comprises a first evaluator for the first version and a second evaluator for the second version;
identify the first symbol based on the code corresponding to the first version;
initialize a first interpreter of the first evaluator using the first symbol based on the first symbol indicating the first version and the second symbol indicating the second version; and
generate the circuit layout described by the code using the first interpreter and the identified first symbol.

18. The non-transitory computer readable medium of claim 17, wherein the first symbol and the second symbol are loaded into a symbol table of the design platform.

19. The non-transitory computer readable medium of claim 17, wherein the design platform comprises a PYTHON design platform.

20. The non-transitory computer readable medium of claim 17, wherein the code comprises PYTHON code.

* * * * *